United States Patent [19]

Seber

[11] Patent Number: 5,014,636

[45] Date of Patent: * May 14, 1991

[54] COMPOSITE PADDED FABRIC MATERIAL AND EDGE BINDING SYSTEM

[75] Inventor: Brett P. Seber, Laguna Niguel, Calif.

[73] Assignee: McGuire-Nicholas Company, Inc., City of Commerce, Calif.

[*] Notice: The portion of the term of this patent subsequent to Jun. 12, 2007 has been disclaimed.

[21] Appl. No.: 350,296

[22] Filed: May 11, 1989

[51] Int. Cl.$^5$ .............................................. B32B 7/08
[52] U.S. Cl. ................................. 112/419; D2/243 R
[58] Field of Search ...................... 112/419, 417, 418; 422/252; 156/73.1; 428/246, 296, 304.4; 224/904; D2/243 R, 243 A

[56] References Cited

U.S. PATENT DOCUMENTS

| | | | |
|---|---|---|---|
| 10,861 | 8/1887 | Palmer | 112/419 X |
| 1,582,161 | 4/1926 | Brown | 112/419 |
| 2,138,610 | 11/1938 | Overly | 112/419 X |
| 4,190,010 | 2/1980 | Bibby | 112/419 |
| 4,486,492 | 12/1984 | Ziliotto | 428/252 |
| 4,608,298 | 8/1986 | Klaff | 428/246 |

Primary Examiner—Andrew M. Falik
Assistant Examiner—Sara M. Current
Attorney, Agent, or Firm—Philip D. Junkins

[57] ABSTRACT

An improved composite laminated fabric sheet material for use in the fabrication of abrasion and tear resistant carpentry and other tradesmen aprons and nail bags, tool pouches and tool holders, belts and back supports, cordless tool holsters, knee pads and other related items and incorporating edge binding and seam binding strip fabric material to form pockets and pouches of the composite fabric sheet material and to protect the edges thereof.

5 Claims, 1 Drawing Sheet

COMPOSITE PADDED FABRIC MATERIAL AND EDGE BINDING SYSTEM

BACKGROUND OF THE INVENTION

1. Field of the Invention

The present invention relates to fabric material to be utilized in the fabrication of items which are normally subjected to abrasion, punctures and tears during extended periods of use. More particularly, the invention relates to abrasion resistant, high strength composite padded fabric material for use in the fabrication of carpenters aprons and nail bags, tool pouches and tool holders, cordless tool holsters, belts and back support pads, knee pads, and the like.

2. Description of the Prior Art

Classically, tradesmen of many skill and vocational classifications have used tool pouches and tool holders, nail bags and aprons, belts and back support pads, tool holsters and other body supported and carried items fabricated out of leather, i.e., principally high grade cow hide material. Such material, when properly tanned, exhibits high tensile strength and longevity and is tough, non-abrasive and tear resistant in the context of rugged use by professional construction workers. Further, such material has been found to hold at its high stress seam areas joined by single or double stitching and/or rolled rivets. However, leather items for tradesmen are costly and they are heavy thereby leading in many cases to sore hips, tired legs and aching backs.

In recent years, numerous attempts have been made to lighten up tradesmen's tool carrying apparel and items through the use in their fabrication of various fabrics including heavy weave canvas materials and nylon and polypropylene thread woven fabrics. Such materials have proven to be objectional as not assuring product longevity and durability, particularly with respect to ravelling of the fabric materials at their edges and maintaining edge binding.

It is an object of the present invention to provide an improved fabric material and edge binding system for use in the fabrication of tradesmen aprons and nail bags, tool pouches and tool holders, belts and back supports, cordless tool holsters, knee pads, and related items.

It is a further object of the invention to provide an improved composite padded fabric material with bound edges for use in the fabrication of tradesmen items which are normally subjected to high abrasion, punctures and tears, and high pull forces, during extended periods of use.

It is a still further object of the invention to provide an improved laminated padded fabric material and edge binding system for use in the fabrication of carpentry and construction worker aprons and nail bags, tool pouches and tool holders, belts and back supports and other items and which exhibits high abrasion, puncture and tear resistance and high strength characteristics throughout the material and at points of seaming and joinder via stitching and riveting.

It is another object of the invention to provide an improved double laminated padded fabric material for use in the fabrication of tradesmen items and which includes at its edges binding fabric material exhibiting high strength and stress resistance in the areas of stitched fabrication and rivet affixation.

Other objects and advantages of the invention will be apparent from the following summary and detailed descriptions of the invention, taken together with the accompanying drawing figures.

SUMMARY OF THE INVENTION

The present invention relates to an improved composite fabric material for use in the fabrication of carpentry and other tradesmen aprons and nail bags, tool pouches and tool holders, belts and back supports, cordless tool holsters, knee pads, and other related items, and which exhibits high abrasion, puncture and tear resistance, high overall strength, and substantial flexibility characteristics over long periods of rugged use. The composite fabric material of the invention is comprised of a heat and pressure formed double laminate of like outer primary layers of tight-woven threads of high-tenacity nylon fibers and an intermediate padding layer of cross-linked, high-density, closed-cell or open-cell, flexible synthetic polymer foam.

In the fabrication of the composite fabric material of the invention the intermediate synthetic polymer foam layer (preferably a closed-cell polyethylene copolymer) is initially bonded to a first outer woven nylon fabric layer by heating a first side of the foam layer to the point that the face of the heated side of such layer reaches its melting point temperature and thereafter interfacing the heated side of such layer with a first outer fabric layer under pressure. Thereafter, a second side of the foam layer is heated to the point that the face thereof reaches its melting point temperature followed by the interfacing of the second side of the foam layer with a second woven nylon fabric layer under pressure. The face heating of the intermediate foam layer, during the double laminate fabrication methodology, may be accomplished by flame heating, infrared radiation heating or ultrasonic heating.

Alternatively, the composite fabric material of the invention may be fabricated by adhesively bonding, in sequence, the outer woven nylon fabric layers to the intermediate padding layer of foam material under pressure with the application of heat. The adhesive which bonds the outer woven fabric layers to the intermediate foam layer may be a hot melt, solvent based or aqueous based adhesive. Thus, latex based and acrylic, polyester and polyamide based adhesives, along with a variety of other thermoplastic synthetic adhesives are suitable for binding the outer layers to the intermediate layer to form the double laminate material of the invention.

The composite material of the invention, as a double laminate padded fabric material, exhibits exceptional resistance to abrasion, punctures and tears, high overall strength, and substantial flexibility characteristics over long periods of rugged use in the form of tradesmen aprons, bags, pouches, tool holders, belts, holsters, knee pads, and related items. The intermediate foam padding layer of the composite material may range from about 0.8 mm to about 3.6 mm in thickness with the final double laminate of the material having a thickness range of from about 1.2 mm to about 4.8 mm.

In accordance with the present invention the composite fabric material is used in the fabrication of a wide variety of tradesmen work items which are formed with a multiplicity of pockets, pouches and loops. Such items require numerous forms of protective edge bindings and seam bindings utilizing strips of woven nylon fabric material stitched to one or more layers of the composite fabric material at their edges and seams and with reinforcing rivets placed at edge and seam points of high stress and pull. Where edge protection of a single layer of the composite fabric material is required, the protective edge binding material is run along the edge of the composite material and double folded on each side thereof with the binding material's edges folded under and back against the composite material whereby the binding material forms a double layer adjacent each side of the composite material in its edge portion with no fabric edges exposed to wear and tear. The binding material is then straight stitched to the composite along its edge portion. Where edge and seam protection of two layers of the composite fabric material is required, the layers of such material may be first loop or coil stitched together and thereafter the protective edge binding material is applied and stitched as previously indicated. Tradesmen aprons and nail bags, tool pouches and tool holders and other items fabricated of the improved composite fabric material of the invention utilizing the edge binding system thereof exhibit high abrasion, puncture and tear resistance and high strength characteristics throughout there structure at all points of seaming and joinder.

BRIEF DESCRIPTION OF THE DRAWING FIGURES

DETAILED DESCRIPTION OF A PREFERRED EMBODIMENT

The basic components of the abrasion resistant, high strength composite padded fabric material of the present invention are outer fabric layers formed of tight-woven threads formed of high-tenacity nylon fibers and an intermediate padding layer of cross-linked, high-density, flexible synthetic polymer foam. The characteristics of the inner foam layer and outer woven fabric layers must be carefully matched in order to provide (when bonded together as a double laminate) a composite material that is highly flexible without separation of the laminated layers upon long-term exposure to rugged abrasion and tear use when formed into tradesmen aprons, nail bags, tool pouches and holders, belts and back supports, tool holsters, knee pads and related items.

The intermediate layer of synthetic polymer foam material (of open or closed cell structure) may be formed of homopolymers and copolymers of polyethylene, polyurethane, or of a vinyl-based polymer. The foam must be cross-linked and must be flexible and capable of being formed into sheets of 4 mm thickness or less. A preferred closed-cell polyethylene foam of 1.6 mm thickness has a tensile strength of 620 g/cm of width and may be elongated 250% to its break point. The outer laminate layers of tight-woven fabric is preferably woven of threads of high-tenacity nylon fibers (1350/560 denier) exhibiting outstanding durability with respect to abrasion, puncture and tear forces.

Figure 1:
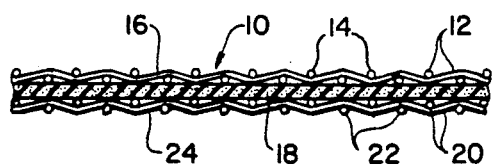
FIG. 1 is an enlarged sectional view of a composite double laminated piece of the fabric material of the present invention with the outer woven fabric layers bonded to the intermediate foam padding layer.

Referring now to FIG. 1 of the drawing, the composite laminated padded fabric material 10 of the invention comprises a double laminate of a first outer layer 12 formed of tight-woven warp threads 14 and weft threads 16 of high-tenacity nylon fibers, an intermediate padding layer 18 of cross-linked, high-density synthetic polymer foam, and a second outer fabric layer 20 also formed of tight-woven warp threads 22 and weft threads 24 of high-tenacity nylon fibers. The outer fabric layers 12 and 20 are bonded to the intermediate layer 18 as described in my U.S. patent application No. 07/306,690 filed Feb. 6, 1989 entitled "Abrasion Resistant, High Strength Composite Padded Fabric Material."

Figure 2:
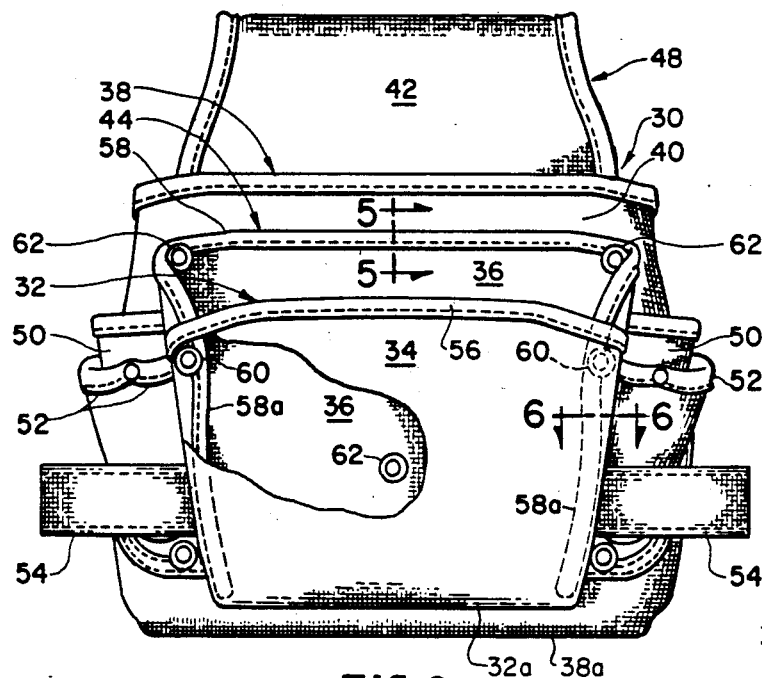
FIG. 2 is a front view of a tradesmen's nail bag and tool pouch fabricated of the composite laminated fabric of FIG. 1 with the front pocket of such nail bag and tool pouch in part cut away to show fabric edge binding and seaming in accordance with the invention.
Figure 3:
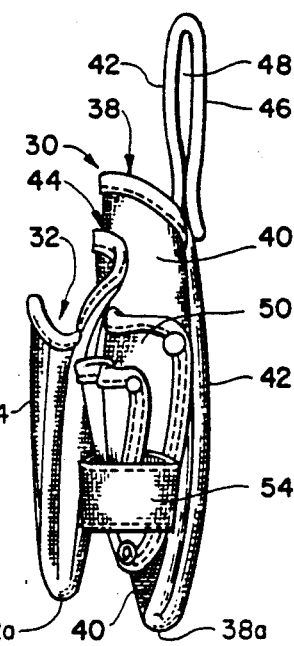
FIG. 3 is a right side view of the nail bag and tool pouch of FIG. 2.
Figure 4:
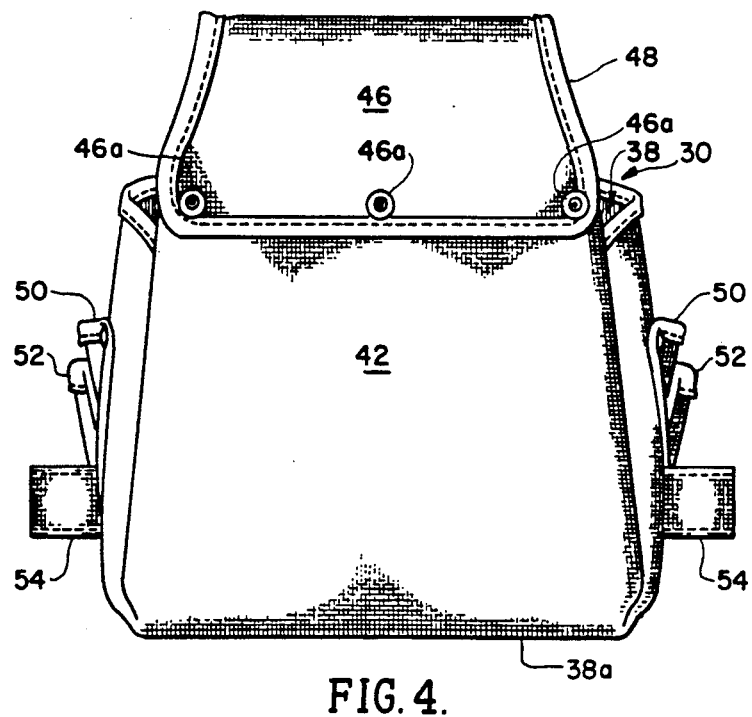
FIG. 4 is a rear view of the nail bag and tool pouch of FIG. 2.

To illustrate the use of the double laminate padded fabric material of the present invention, there is shown in FIGS. 2, 3 and 4 front, right side and rear views of a tradesmen's nail bag and tool pouch. The nail bag and tool pouch 30 is fabricated of two principal pieces of the laminate fabric material 10 to form a front pocket 32 (having a front wall 34 and a rear wall 36) and a rear pocket 38 (having a front wall 40 and a rear wall 42). The placement of the front pocket structure and its affixation to the rear pocket structure creates a semi-open intermediate pocket 44 (formed by rear wall 36 and front wall 40 of the front and rear pockets, respectively).

The rear wall 42 of the rear pocket 38 has an extended portion 46 which is folded rearwardly and downwardly and affixed to the rear wall 42 (see particularly FIG. 4) by a series of rivets 46a thereby forming a belt loop 48 for mounting the nail bag and tool pouch 30 to a tradesmen's belt. The nail bag and tool pouch structure also has mounted to each side thereof an inner side tool pocket 50, outer side tool pocket 52 and a side tool loop 54.

The front pocket 32 of the bag-pouch structure 30 is fabricated, in accordance with the invention, from a single elongated piece of the double laminate padded fabric material 10. Initially an edge binding strip of woven nylon fabric material is stitched to the laminate fabric material across one end thereof. The pocket forming laminate material is thereafter folded near (but not at) its mid-point along a line 32a and the overlapping edges of the laminate material are loop or overhand stitched along their length on each side of the material. An edge binding strip 58 of woven nylon fabric material is then linearly stitched along the loop-stitched overlapping side edges of the pocket walls 34 and 36 on one side thereof (side binding/seaming area 58a), upwardly and across the upper edge of pocket wall 36 and downwardly along the loop-stitched overlapping side edges of the pocket walls 34 and 36 on the other side thereof (side binding/seaming area 58a). The stitching of the binding strip 58 in the overlapping side edges of the pocket walls 34 and 36 incorporates the ends of the binding strip 56. To further protect the integrity of the binding and seaming structure of pocket 32 in the high stress areas at the side juncture points of binding strip 56 and binding strip 58, there are placed rolled rivets 60. Following the edge stitching of binding strip 58 and the placement of rivets 60, the front pocket structure is turned inside-out to form the finished pocket 32 with the side binding/seaming areas 58a located within the pocket structure on each side thereof as shown in FIG. 2.

Figure 5:
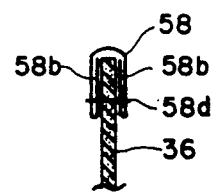
FIG. 5 is a section view of the fabric edge binding structure of the upper back edge of the front pocket of the nail bag and tool pouch of FIG. 2 taken on line 5—5 of FIG. 2.

FIG. 5 is a section view of the fabric edge binding structure of the upper back edge of rear wall 36 of the front pocket 32 of the nail bag and tool pouch of FIG. 2 taken on line 5—5 of FIG. 2. As shown in FIG. 5 the edge binding strip 58 includes side back folds 58b of the woven nylon binding strip material lying adjacent the edge portion of rear wall 36 of pocket 32. The edge binding strip 58 and its back folds 58b are permanently united by linear or running stitches 58d extending along the length of the binding material.

Figure 6:
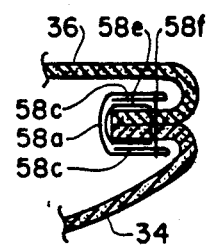
FIG. 6 is a section view of the fabric inside edge binding structure of a side seam of the front pocket of the nail bag and tool pouch of FIG. 2 taken on line 6—6 of FIG. 2.

FIG. 6 is a section view of the fabric inside edge binding Q structure of a side seam between pocket walls 34 and 36 of the front pocket 32 of the nail bag and tool pouch 30 of FIG. 2 taken on line 6—6 of FIG. 2. As shown in FIG. 6 the edge binding/seaming strip 58a includes side back folds 58c of the woven nylon binding strip material lying adjacent the overlapping edge portion of front wall 34 and rear wall 36 of pocket 32. The overlapping edge portions of the pocket walls 34 and 36 are maintained together by loop, overhand or spiral stitches 58e and the edge binding/seaming strip 58a and its back folds 58c are permanently united by running or linear stitches 58f extending along the length of the binding strip material.

The rear pocket 38 (having a front wall 40 and a rear wall 42) is fabricated in the same manner as the front pocket 32, i.e., edge binding strip material is applied across the upper edge of front wall 40 and side binding-/seaming strip material is applied to the side overlapping edges of such rear pocket. The rear pocket structure is then turned inside-out to form the final pocket structure as shown in FIGS. 2, 3 and 4 with the attendant belt loop 48. The front pocket structure 32 (including front wall 34 and rear wall 36) is assembled to the rear pocket structure 38 (including front wall 40 and rear wall 42) by rolled rivets 62 which join the rear wall 36 of front pocket structure 32 to the front wall 40 of the rear pocket structure 38. The arrangement of front pocket structure 32 affixed to rear pocket structure 38 by rivets 62 creates the semi-open intermediate pocket structure 44.

As previously indicated, the abrasion resistant, high strength composite padded fabric materials used for the construction of tradesmen's work items, in accordance with the present invention, are preferably fabricated as described in my U.S. patent application No. 07/306,690. Work items fabricated of such materials exhibit high abrasion, puncture and tear resistance, high overall strength, and substantial flexibility characteristics. Where such items include pockets and pouches, and protected edges, formed with edge binding strips and material seaming strips applied as described heretofore, the items are extremely strong and durable in all areas subject to high stresses.

In the specification and drawing figures there has been set forth preferred embodiments of the invention and although specific terms have been employed in describing the invention, they are use in a generic and descriptive sense only and not for purposes of limitation, the scope of the invention being defined in the following claims.

What is claimed is:

1. In the fabrication of trademen's work items including aprons and nail bags, tool pouches and tool holders, cordless tool holsters, and the like made of fabric sheet material and having inside edge seams including overlapping edge areas of two layers of the fabric sheet material and wherein the inside seams are subject to high abrasion and stress forces, the combination of:
   a) two layers of like abrasion and tear resistant, high strength composite laminated padded fabric material wherein each layer of padded fabric material is comprised of first and second outer primary laminate layers of tight-woven threads of high-tenacity nylon fibers, and an intermediate synthetic polymer foam laminate layer coextensive with said outer primary laminate layers and permanently bonded to the threads thereof, the overlapping edge areas of said layers being initially joined by loop stitching thereof; and
   b) edge binding and seaming fabric strip material comprised of tight-woven threads of high-tenacity nylon fibers, said strip material extending along the inside overlapping edge areas of the two layers of said laminated padded fabric material to protect said material from delamination at the edges thereof, said strip material being folded outwardly over adjacent edge areas of said overlapping layers of said laminated material on the outer sides thereof encompassing the loop stitching joining said layers in the overlapping edge areas thereof and back folded inwardly whereby the edges of said strip material on each outer side of said laminated material are aligned with the edges of said layers of said laminated material, and said folded and back folded strip material being permanently affixed to the edge areas of said layers of laminated material by linear stitches extending over the length of said strip material and applied through the back folds thereof and through the layers of said laminated material without intersecting said loop stitching.

2. In the fabrication of tradesmen's work items in accordance with claim 1 wherein the intermediate synthetic foam layer of said composite laminated fabric sheet material is selected from the group of closed-cell and open-cell foams formed of homopolymers and copolymers of polyethylene, polyurethane, and vinyl-based polymers.

3. In the fabrication of tradesmen's work item in accordance with claim 1 wherein the intermediate synthetic foam layer of said composite laminated fabric sheet material is a closed-cell, cross-linked polyethylene homopolymer or copolymer and has a substantially uniform thickness within said laminated fabric material of from about 0.8 mm to about 3.6 mm.

4. In the fabrication of tradesmen's work items in accordance with claim 1 wherein the intermediate synthetic foam layer of said composite laminated fabric sheet material is a closed-cell, cross-linked polyethylene homopolymer or copolymer and said layer has a tensile strength of at least 35 grams per square millimeter of cross-sectional area and may be elongated at least 100% to its break point.

5. In the fabrication of tradesmen's work items in accordance with claim 1 wherein the first and second outer primary layers of said composite laminated fabric sheet material are formed of tight-woven nylon threads having a denier in the range of 1000/280 to 1350/560 and the intermediate synthetic foam layer of said composite laminated fabric sheet material is selected from the group of closed-cell and open-cell foams formed of homopolymers and copolymers of polyethylene, polyurethane, and vinyl-based polymers, said composite laminated fabric sheet material having a thickness in the range of about 1.2 mm to about 4.8 mm.

* * * * *